United States Patent
Wurzer et al.

(10) Patent No.: US 10,053,150 B1
(45) Date of Patent: Aug. 21, 2018

(54) DECK PLATE FOR A TRUCK CHASSIS

(71) Applicants: Adam J. Wurzer, Carroll, IA (US);
Terry D. Wurzer, Panora, IA (US);
David T. Wurzer, Carroll, IA (US)

(72) Inventors: Adam J. Wurzer, Carroll, IA (US);
Terry D. Wurzer, Panora, IA (US);
David T. Wurzer, Carroll, IA (US)

( * ) Notice: Subject to any disclaimer, the term of this patent is extended or adjusted under 35 U.S.C. 154(b) by 38 days.

(21) Appl. No.: 15/432,361

(22) Filed: Feb. 14, 2017

(51) Int. Cl.
*B62D 21/09* (2006.01)
*B62D 25/20* (2006.01)
*B62D 33/02* (2006.01)
*B60D 1/01* (2006.01)

(52) U.S. Cl.
CPC ............ *B62D 21/09* (2013.01); *B60D 1/015* (2013.01); *B62D 25/2027* (2013.01); *B62D 25/2054* (2013.01); *B62D 33/02* (2013.01)

(58) Field of Classification Search
CPC ..... B60J 7/08; B60J 7/106; B60J 7/16; B62D 21/09; B62D 21/10; B62D 25/20; B62D 25/2027; B62D 25/2054; B62D 33/02
USPC .......................................... 296/184.1, 193.07
See application file for complete search history.

(56) References Cited

U.S. PATENT DOCUMENTS

| | | | |
|---|---|---|---|
| 5,449,191 A * | 9/1995 | Cattau | B62D 53/0807 280/407 |
| 6,722,728 B2 * | 4/2004 | Borugian | B62D 33/00 296/184.1 |
| 9,346,491 B1 * | 5/2016 | Wurzer | B62D 21/09 |
| 2004/0164590 A1 * | 8/2004 | Borugian | B62D 33/00 296/193.07 |

* cited by examiner

*Primary Examiner* — Jason S Daniels
(74) *Attorney, Agent, or Firm* — Dennis L. Thomte; Thomte Patent Law Office LLC (57) ABSTRACT

A deck plate assembly is provided for mounting between the first and second frame members of a truck. The assembly includes a horizontally disposed deck plate which is positioned between the first and second frame members of the truck and secured thereto. Stiffening or strengthening members are secured to the underside of the deck plate to prevent downward deflection of the deck plate should a person stand on the deck plate.

15 Claims, 6 Drawing Sheets

DECK PLATE FOR A TRUCK CHASSIS

BACKGROUND OF THE INVENTION

Field of the Invention

This invention relates to a deck plate for attachment to the first and second longitudinally extending frame members of a truck chassis and which is positioned thereon between the rearward end of the truck cab and fifth wheel of the truck. More particularly, this invention relates to a unique method of strengthening or stiffening the deck plate.

Description of the Related Art

Semi-trailer trucks or tractors have long been used to pull trailers by way of a fifth wheel hitch structure. The truck or tractor usually has a frame or chassis which has steering wheels at the forward end thereof, drive wheels at the rearward end thereof, an engine, a cab, and a fifth wheel hitch structure at the rearward end of first and second longitudinally extending frame members which are exposed between the rearward end of the cab and the fifth wheel hitch. When a trailer is hitched to the fifth wheel structure of the truck, the front of the trailer is positioned rearwardly of the rearward end of the cab.

As the truck pulls the trailer over the road, debris such as gravel, mud, dirt, road de-icer, etc. is thrown upwardly between the first and second frame members onto the underside of the trailer and also onto the rearward side of the cab. If the truck is not pulling a trailer, the debris is thrown upwardly through the first and second frame members into the air and also onto the rearward side of the cab.

Attempts have been made to position a deck or plate onto the upper ends of the first and second frame member behind the cab but it is believed that those deck plates are difficult to install and are difficult to maintain. Further, the deck plates of the prior art lack structure which prevents the downward movement or bending of the deck plate when a person stands thereon.

Applicants have received U.S. Pat. No. 9,346,491 B1 which represented an improvement in the art. The instant invention relates to an improvement over Applicants' patent in that it strengthens or stiffens the deck plate.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The deck plate assembly of this invention is designed to be secured to a truck chassis between longitudinally extending first and second frame members which extend rearwardly from the cab of the truck to a fifth wheel structure on the frame members. A plurality of spaced-apart cross members extend between the first and second frame members between the cab of the truck and the fifth wheel structure. Further, in some cases, truck components or structure is also positioned between the first and second frame members.

The deck plate assembly of this invention includes a horizontally disposed and rectangular deck plate which is positioned between the first and second frame members between the cab and the fifth wheel structure. The deck plate has a forward end, a rearward end, a first side and a second side. A vertically disposed first side wall, having upper and lower ends, extends downwardly from the first side of the deck plate between the forward and rearward ends thereof. A horizontally disposed first flange, having inner and outer ends, extends inwardly from the lower end of the first side wall. The deck plate also includes a vertically disposed second side wall, having upper and lower ends, which extends downwardly from the second side of the deck plate between the forward end and rearward ends thereof. A horizontally disposed second flange, having inner and outer ends, extends inwardly from the lower end of the second side wall.

A plurality of elongated and horizontally disposed and horizontally spaced-apart strengthening or stiffening members, having a first end and a second end, are secured to the deck plate. The first ends of the strengthening members are secured to the first flange of the deck plate with the second ends of the strengthening members being secured to the second flange of the deck plate so as to extend therebetween. In the preferred embodiment, the strengthening members are selectively longitudinally adjustably secured to the first and second flanges of the deck plate but could be secured thereto in a fixed relationship such as by welding or the like. In the preferred embodiment, the first flange of the deck plate has a plurality of spaced-apart bolt openings formed therein and wherein the second flange of the deck plate has a plurality of spaced-apart bolt openings formed therein. The first and second ends of the strengthening members are selectively longitudinally adjustably secured to the bolt openings in the first and second flanges of the deck plate.

The strengthening members are positioned at the underside of the deck plate in such a manner so as to avoid interference with the cross-members which extend between the first and second frame members and which avoid other components and structure of the truck which may be positioned between the first and second frame members.

It is therefore a principal object of the invention to provide a deck plate for a truck chassis.

A further object of the invention is to provide a deck plate for a truck chassis which is positioned between the frame members of a truck between the rear end of the cab of the truck and the forward end of the fifth wheel structure thereon.

A further object of the invention is to provide a deck plate for a truck chassis which has strengthening or stiffening members secured to the underside thereof.

A further object of the invention is to provide a deck plate for a truck chassis which has strengthening or stiffening members selectively longitudinally adjustably secured to the underside thereof.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
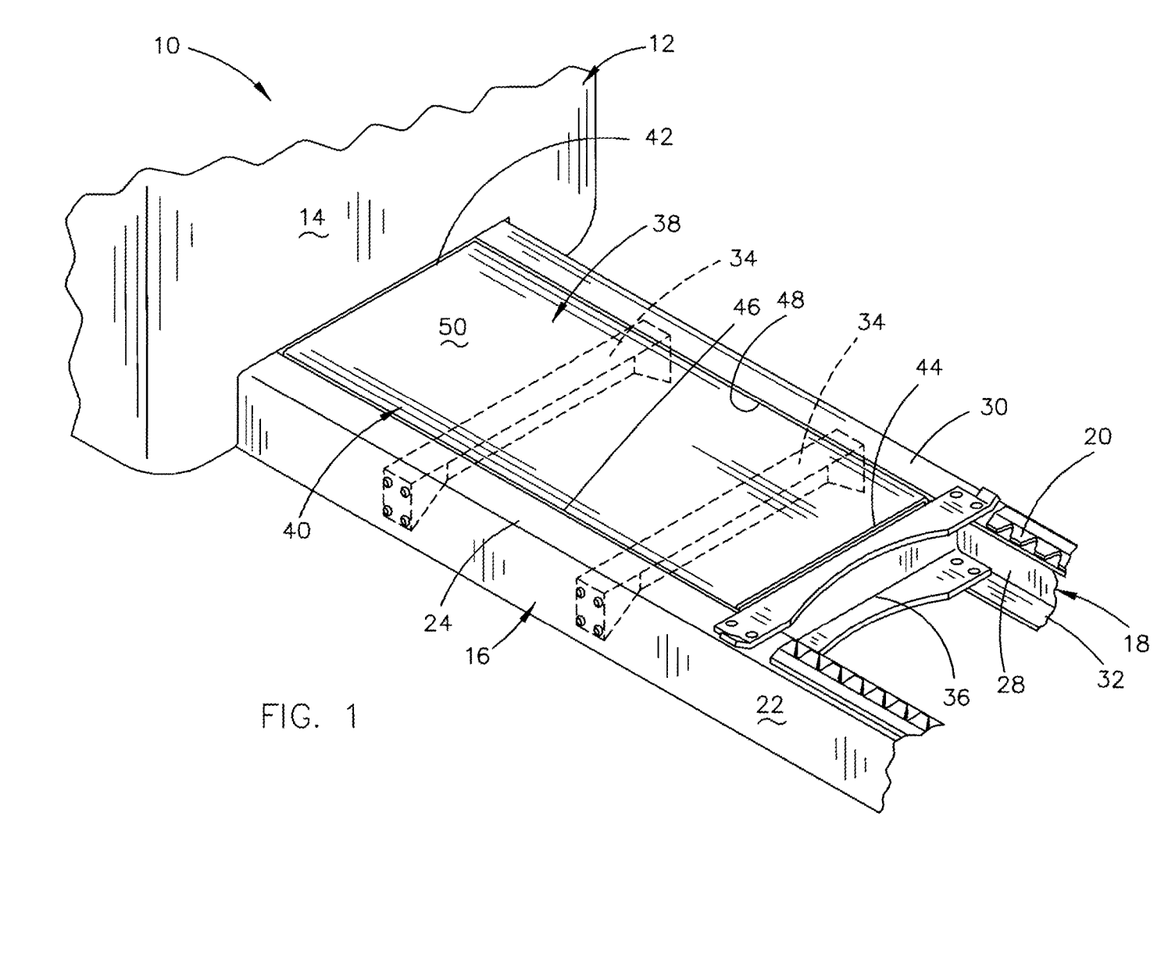
FIG. 1 is a rear perspective view of the deck plate assembly of this invention mounted on the frame member of a truck.

The numeral 10 refers to a conventional semi-truck or tractor which includes a cab 12 having a rearward side 14. Truck 10 includes first and second longitudinally extending frame members 16 and 18 which extend rearwardly from the forward end of the truck to a fifth wheel hitch structure 20. Frame members 16 and 18 are conventional in design. Frame member 16 includes a vertically disposed web portion 22, an upper flange 24 and a lower flange 26. Frame member 18 includes a vertically disposed web portion 28, an upper flange 30, and a lower flange 32. One or more horizontally disposed cross-members 34 are secured to the frame members 16 and 18 and extend therebetween in conventional fashion and are spaced-apart. Normally, a cross-member 36 extends between frame members 16 and 18 just forwardly of the fifth wheel structure 20 as seen in FIG. 1. It is the area between the frame members 16 and 18 from the rear of the cab 12 to the fifth wheel structure 20 that the debris will pass upwardly therethrough unless a deck plate is provided.

Figure 5:
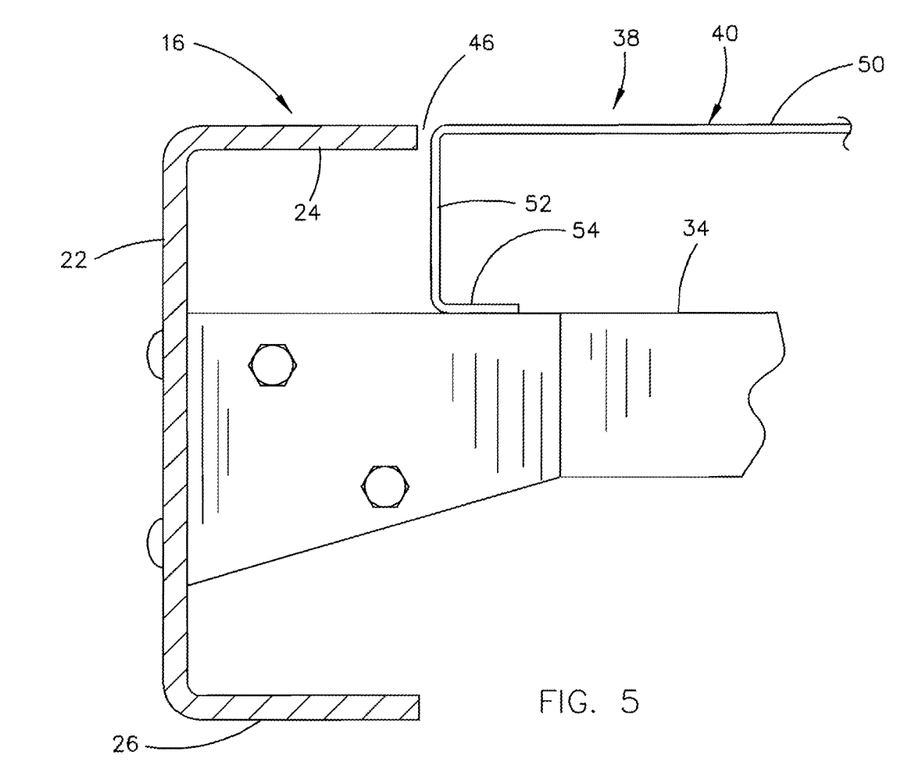
FIG. 5 is a partial end view illustrating the manner in which the deck plate of this invention rests upon the cross-members of the truck chassis.

The deck plate assembly of this invention is referred to generally by the reference numeral 38. Deck plate assembly includes a horizontally disposed deck plate 40 which is preferably constructed of a metal material such as aluminum. Deck plate 40 will be described as having a forward end 42, a rearward end 44, a left or first side 46 and a right or second side 48. Deck plate 40 includes a central portion 50. A side wall 52 extends downwardly from the left side of central portion 50 as seen in FIG. 5. A horizontally disposed flange 54 extends horizontally inwardly from the lower end of side wall 52 and has a plurality of spaced-apart bolt openings 56 formed therein.

Figure 3:
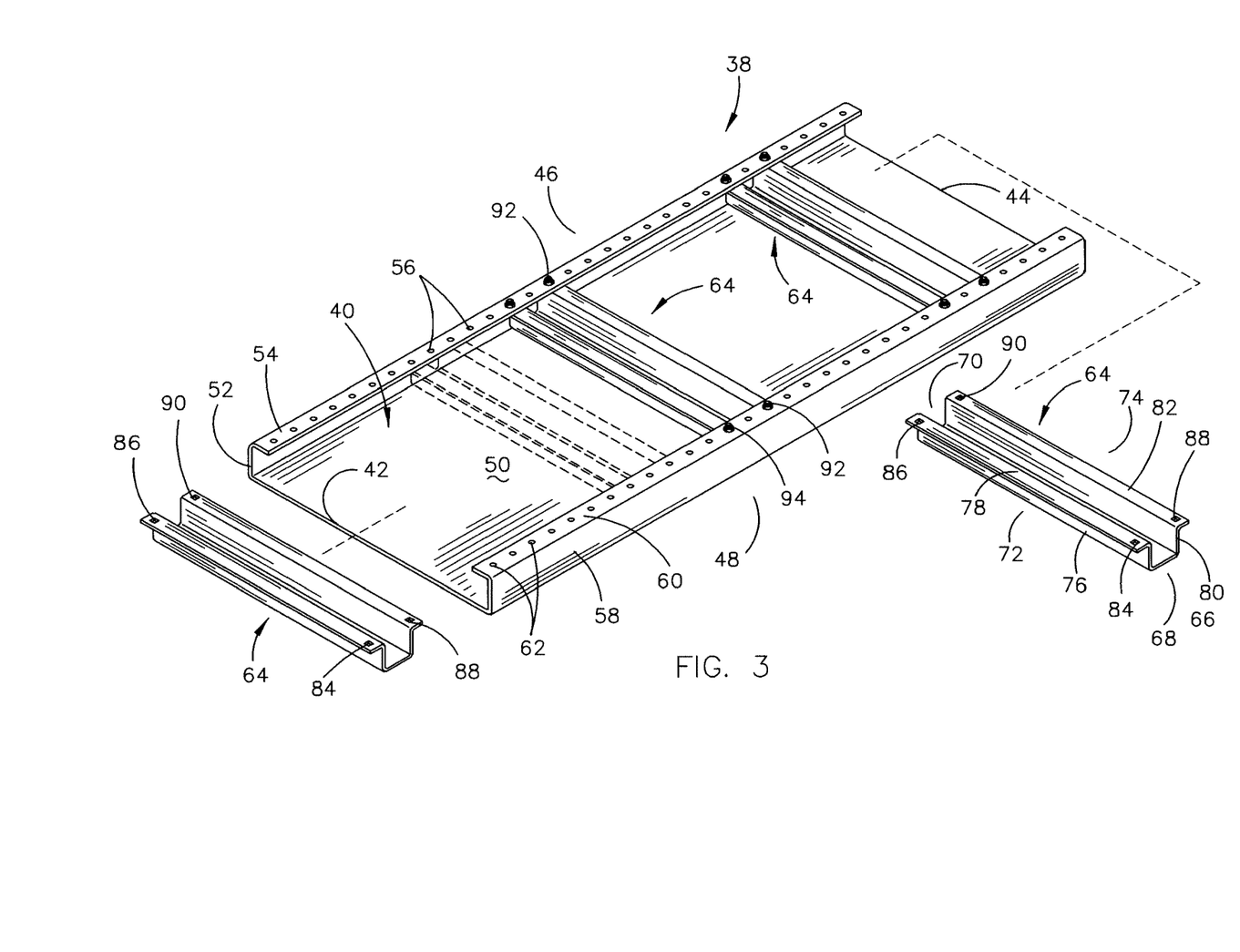
FIG. 3 is a partial exploded perspective view of the underside of the deck plate assembly of this invention.
Figure 4:
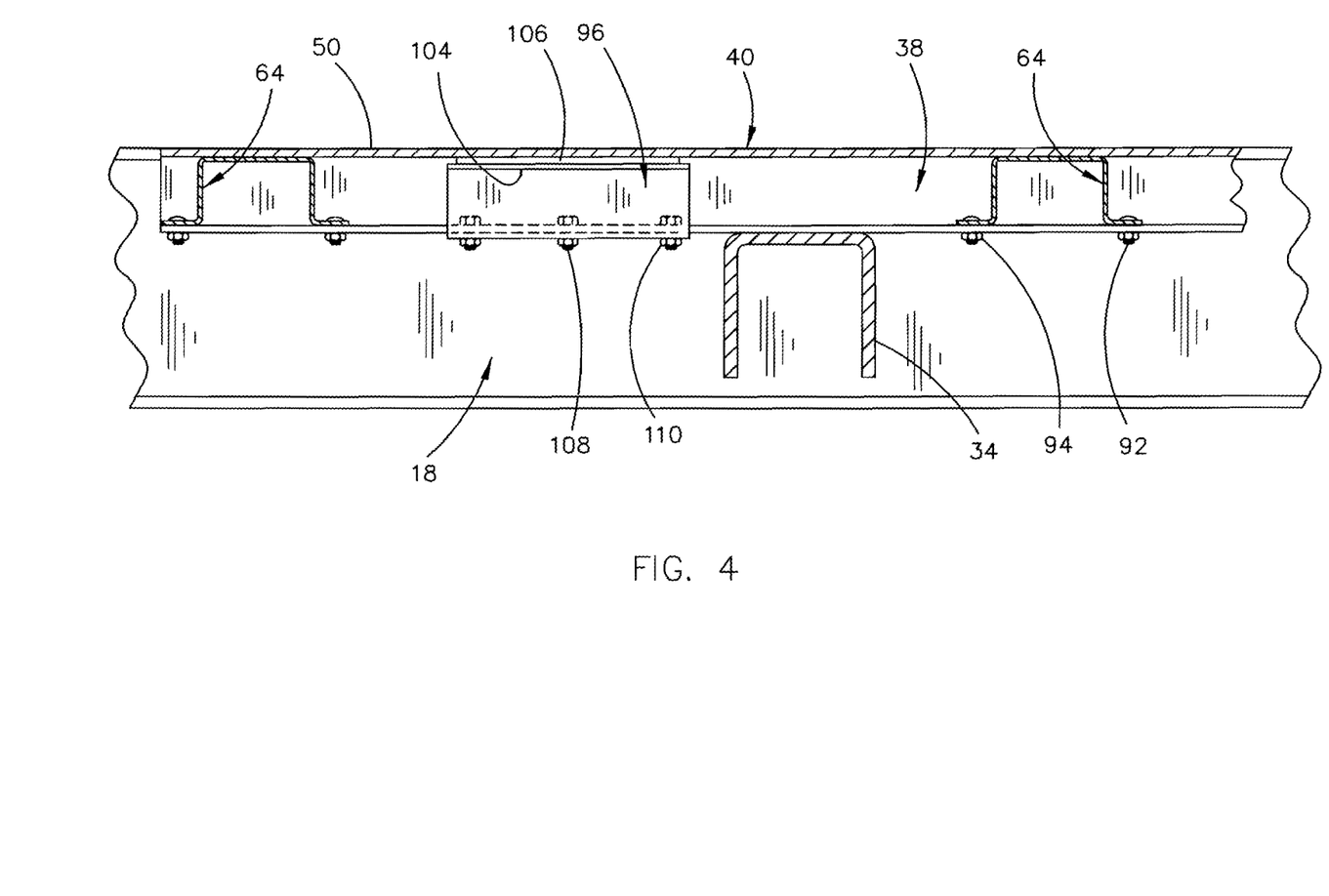
FIG. 4 is a partial sectional view of the deck plate assembly of this invention.

A side wall 58 extends downwardly from the right side of central portion 50 as seen in FIG. 3. A horizontally disposed flange 60 extends horizontally inwardly from the lower end of side wall 58 and has a plurality of spaced-apart bolt openings 62 formed therein.

A plurality of elongated and horizontally disposed strengthening or stiffening members 64 are selectively longitudinally adjustably secured to the flanges 54 and 60 of the deck plate 40 and extend therebetween in a horizontally spaced-apart manner as will now be described. Each of the strengthening members 64 includes a horizontally disposed base portion 66 having a first end 68, a second end 70, a first side 72 and a second side 74. A first side wall 76 extends downwardly from side 72 of base portion 66. A horizontally disposed flange 78 extends outwardly from the lower end of side wall 76. A second side wall 80 extends downwardly from side 74 of base portion 66. A horizontally disposed flange 82 extends outwardly from the lower end of side wall 80.

Flange 78 has a bolt opening 84 formed therein at one end thereof and has a bolt opening 86 formed therein at its other end. Flange 82 has a bolt opening 88 formed therein at one end thereof and has a bolt opening 90 formed therein at its other end. Each of the members 64 are longitudinally adjustably secured to the flanges 54 and 60 of the deck plate 40 as will now be described.

Usually the deck plate 40 will be placed on some sort of a horizontally disposed member in an upside-down manner such as seen in FIG. 3. A member 64 is inverted and is slipped into the deck plate 40 between the side walls 52 and 58 below the flanges 54 and 60. The member 64 is then slidably moved into a position where it will not interfere with any of the cross-members 34 or any other structure on the truck. A bolt 92 is then extended upwardly through bolt opening 84 in flange 78 of member 66 and upwardly through one of the bolt openings 62 in flange 60. A nut 94 is then threaded onto the bolt 92. The other end of flange 78 is similarly secured to flange 54. The ends of flange 82 are similarly attached to flanges 54 and 60.

The other members 64 are similarly attached to the deck plate 40. The deck plate 40, with the members 64 secured thereto, is then turned right side up and placed downwardly between the frame members 16 and 18 until the flanges 54 and 60 of deck plate 40 rest upon the cross-members 34 as seen in FIG. 5. The deck assembly 38 is then secured to the frame members 16 and 18 in the same manner as illustrated in our U.S. Pat. No. 9,346,491 B1, the disclosure of which is incorporated herein if needed to complete this disclosure.

Figure 2:
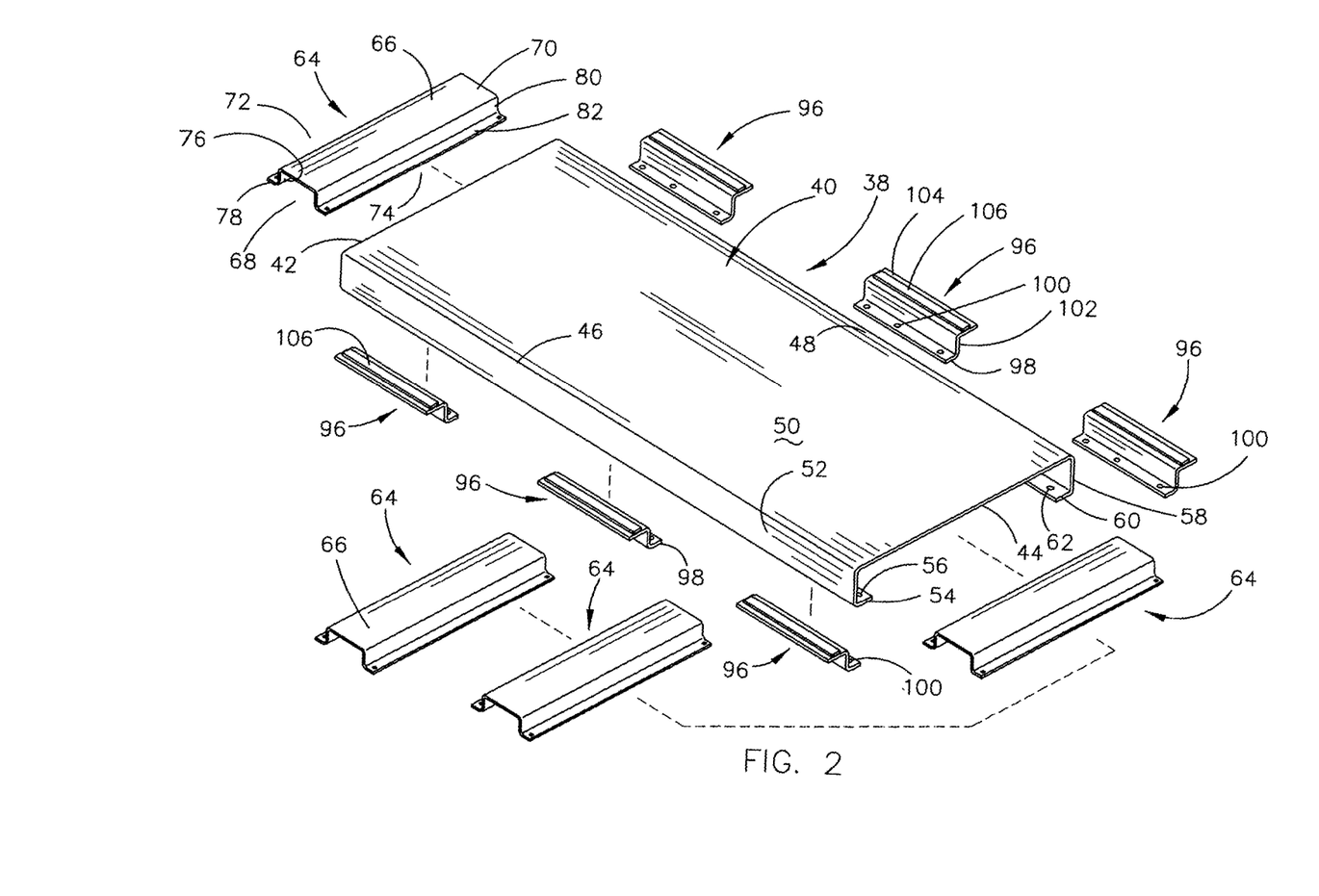
FIG. 2 is an exploded perspective view of the deck plate assembly of this invention.

FIG. 2 illustrates a plurality of mounting clips 96 which are utilized in the invention. Since the mounting clips 96 are identical, only one of the mounting clips 96 will be described in detail. Each of the mounting clips 96 includes a lower horizontally disposed flange 98 having bolt opening 100 formed therein. Clip 96 also includes a vertically disposed wall 102 which extends horizontally from flange 98. An upper flange 104 extends horizontally upwardly from flange 98. An upper flange 104 extends horizontally from the upper end of wall 102. Preferably, the upper surface of flange 104 has a tape strip 106 positioned therein.

Figure 6:
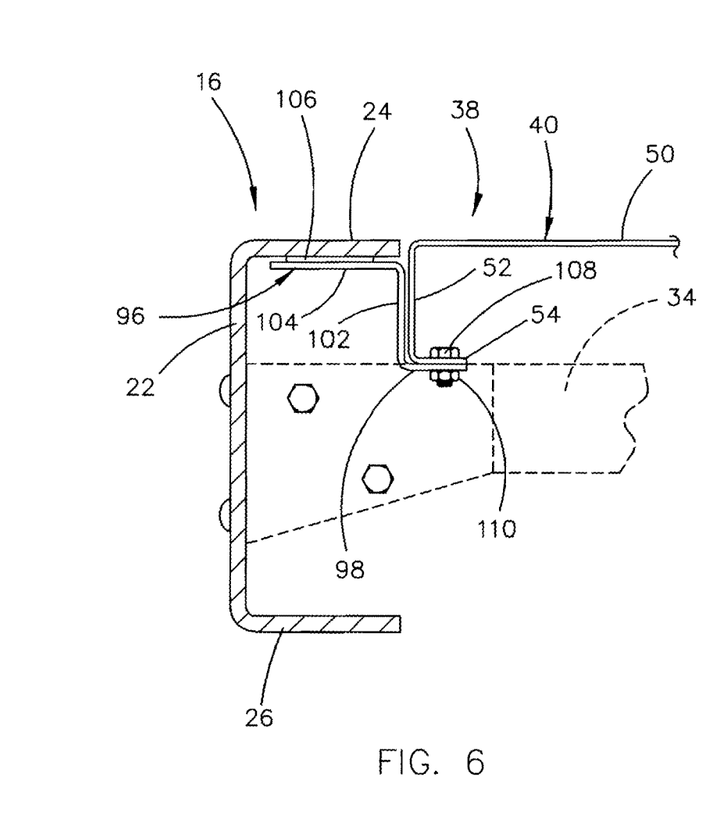
FIG. 6 is a partial end view which illustrates the manner in which the deck plate assembly of this invention is secured to the frame member of a truck.
Figure 7:
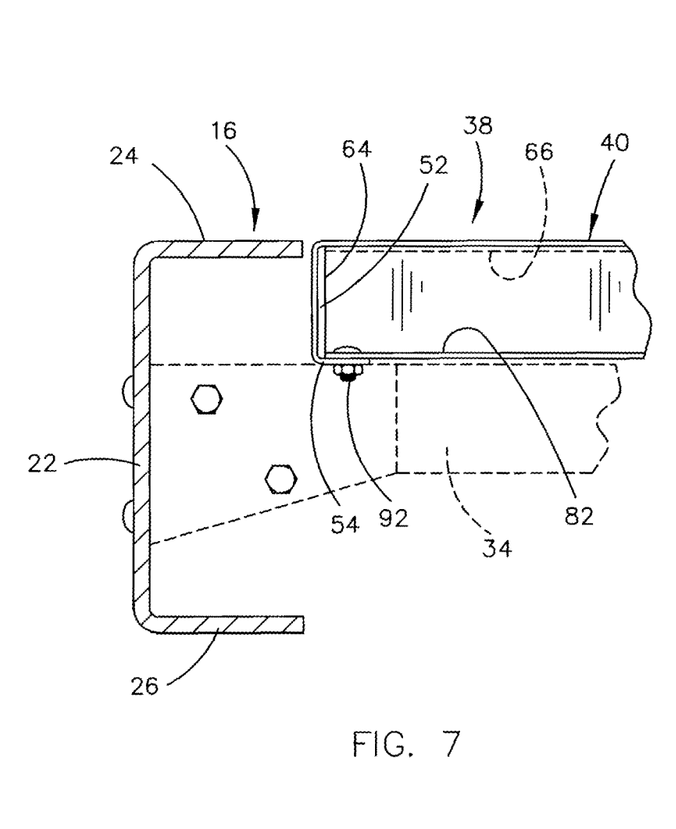
FIG. 7 is a partial end view which illustrates the manner in which the ends of the strengthening or stiffening members are secured to the ends of the deck plate.

After the deck plate 40, with the members 64 secured thereto, are lowered into position as described above, the mounting clips 96 are then positioned as seen in FIG. 6 so that the upper flange 104 thereof is positioned below the upper flange 24 of frame member 16 and so that the lower flange 98 is positioned below flange 54 of deck plate 40 as seen in FIG. 6. Bolts 108 are then extended downwardly through the bolt openings in flange 56, through bolt opening 100 in clip 96 and secured thereto by nuts 110.

The same procedure is followed for all the mounting clips 96 at the left side of deck plate 40. The mounting clips 96 at the right side of deck plate 40 are positioned and installed in the same fashion as just described. Thus, the resting of the flanges 54 and 60 on the cross-members 34 limits the downward movement of the deck plate 40 with respect to the frame members 16 and 18 and the mounting clips 96 limit the upward movement of the deck plate 40 with respect to the frame members 16 and 18.

The use of the strengthening members 64 at the underside of deck plate 40 strengthens or stiffens the central portion 50 thereby preventing undue downward movement of central portion 50 should a person step upon the deck plate 40.

The selectively placement of the members 64 avoids interference by the cross-members 34 or any other structure of the truck. It is preferred that the members 64 be bolted to the flanges 54 and 60 but they could be welded to the flanges 54 and 60 once it has been determined that their placement is correct.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A deck plate assembly for a truck chassis including longitudinally extending first and second frame members having forward and rearward ends with a cab positioned at the forward ends of the first and second frame members rearwardly of the cab and a fifth wheel structure positioned at the rearward ends of the first and second frame members, with each of the first and second frame members having a horizontally disposed upper flange, with inner and outer ends, a web, having upper and lower ends, extending downwardly from the outer end of the upper flange, and a horizontally disposed lower flange with inner and outer ends, extending inwardly from the lower end of the web, and with at least one horizontally disposed and horizontally spaced-apart cross-member secured to the first and second frame members and extending therebetween, rearwardly of the cab, the deck plate assembly comprising:

a horizontally disposed rectangular deck plate having a forward end, a rearward end, a first side, a second side, an upper side and a lower side;

a vertically disposed first side wall, having upper and lower ends, which extends downwardly from said first side of said deck plate between said forward and rearward ends thereof;

a horizontally disposed first flange, having an inner end, an outer end, an upper side and a lower side, extending inwardly from said lower end of said first side wall;

a vertically disposed second side wall, having upper and lower ends, which extends downwardly from said second side of said deck plate between said forward and rearward ends thereof;

a horizontally disposed second flange, having an inner end, an outer end, an upper side and a lower side, extending inwardly from said lower end of said second side wall;

said deck plate configured to be positioned between the first and second frame members above the at least one cross-member;

said first and second flanges of said deck plate resting upon the at least one cross-member to limit the downward movement of said deck plate with respect to the first and second frame members;

said deck plate being secured to the first and second frame members to limit the upward movement of said deck plate with respect to the first and second frame members;

an elongated and horizontally disposed stiffening member having first and second ends; and said first end of said stiffening member being secured to said first flange of said deck plate with said second end of said stiffening member being secured to said second flange of said deck plate so as to extend transversely between said first and second flanges of said deck plate.

2. The deck plate assembly of claim 1 wherein said stiffening member is selectively longitudinally adjustably secured to said first and second flanges of said deck plate.

3. The deck plate assembly of claim 1 wherein said first end of said stiffening member is positioned on said upper side of first flange of said deck plate and wherein said second end of said stiffening member is positioned on said upper side of said second flange of said deck plate.

4. The deck plate assembly of claim 1 wherein a plurality of horizontally spaced-apart stiffening members are secured to said first and second flanges of said deck plate.

5. The deck plate assembly of claim 4 wherein each of said stiffening members are selectively longitudinally adjustably secured to said first and second flanges of said deck plate.

6. The deck plate assembly of claim 4 wherein said first flange of said deck plate has a plurality of horizontally spaced-apart bolt openings formed therein and wherein said second flange of said deck plate has a plurality of horizontally spaced-apart bolt openings formed therein.

7. The deck plate assembly of claim 1 wherein said first and second ends of said stiffening member have at least one bolt opening formed therein which is configured to register with the bolt openings in said first and second flanges of said deck plate.

8. The deck plate assembly of claim 1 wherein said stiffening member has an inverted generally U-shaped cross-section.

9. The deck plate assembly of claim 1 wherein said stiffening member comprises an inverted channel member.

10. The deck plate assembly of claim 9 wherein said inverted channel members has first and second flanges extending therefrom which rest upon said first and second flanges of said deck plate.

11. The deck plate of claim 10 wherein each of said first and second flanges of said deck plate have a plurality of spaced-apart bolt openings formed therein and wherein said flanges of said strengthening member have bolt openings formed therein which are configured to register with said bolt openings in said first and second flanges of said deck plate to enable bolts to be extended therethrough.

12. A deck plate assembly for a truck chassis including longitudinally extending first and second frame members having forward and rearward ends with a cab positioned at the forward ends of the first and second frame members rearwardly of the cab and a fifth wheel structure positioned at the rearward ends of the first and second frame members, with each of the first and second frame members having a horizontally disposed upper flange, with inner and outer ends, a web, having upper and lower ends, extending downwardly from the outer end of the upper flange, and a horizontally disposed lower flange with inner and outer ends, extending inwardly from the lower end of the web, and with at least one horizontally disposed and horizontally spaced-apart cross-member secured to the first and second frame members and extending therebetween, rearwardly of the cab, the deck plate assembly comprising:
- a horizontally disposed rectangular deck plate having a forward end, a rearward end, a first side, a second side, and an upper side and a lower side;
- a vertically disposed first side wall, having upper and lower ends, which extends downwardly from said first side of said deck plate between said forward and rearward ends thereof;
- a horizontally disposed first flange, having an inner end, an outer end, an upper side and a lower side, extending inwardly from said lower end of said first side wall;
- a vertically disposed second side wall, having upper and lower ends, which extends downwardly from said second side of said deck plate between said forward and rearward ends thereof;
- a horizontally disposed second flange, having inner and outer ends, extending inwardly from said lower end of said second side wall;
- said deck plate configured to be positioned between the first and second frame members above the one cross-member;
- said first and second flanges of said deck plate resting upon the one cross-member to limit the downward movement of said deck plate with respect to the first and second frame members;
- said deck plate being secured to the first and second frame members to limit the upward movement of said deck plate with respect to the first and second frame members;
- an elongated and horizontally disposed stiffening member having first and second ends;
- said stiffening member comprising an inverted channel member;
- said inverted channel member comprising:
  - (a) a horizontally disposed base portion having a first end, a second end, a first side and a second side;
  - (b) a first side wall, having a first end, a second end, an upper end and a lower end, extending downwardly from said first side of said base portion;
  - (c) a horizontally disposed first flange, having a first end, a second end, an upper side and a lower side, extending horizontally outwardly from said lower end of said first side;
  - (d) said first flange having a first bolt opening formed therein at said first end thereof;
  - (e) said first flange having a second bolt opening formed therein at said second end thereof;
  - (f) a second side wall, having a first end, a second end, an upper end and a lower end, extending downwardly from said second side of said base portion;
  - (g) a horizontally disposed second flange, having a first end, a second end, an upper side and a lower side, extending horizontally outwardly from said lower end of said second sidewall;
  - (h) said second flange having a first bolt opening formed therein at said first end thereof;
  - (i) said second flange having a second bolt opening formed therein at said second end thereof;
- said first end of said first flange of said stiffening member being secured to said first flange of said deck plate by a bolt extending through said first bolt opening in said first flange of said stiffening member and through one of the bolt openings in said first flange of said deck plate;
- said second end of said first flange of said stiffening member being secured to said second flange of said deck plate by a bolt extending through said second bolt opening of said first flange of said stiffening member and through one of said bolt openings in said second flange of said deck plate;
- said first end of said second flange of said stiffening member being secured to said first flange of said deck plate by a bolt extending through said first bolt opening in said second flange of said stiffening member and through one of said bolt openings in said first flange of said deck plate; and
- said second end of said second flange of said stiffening member being secured to said flange of said deck plate by a bolt extending through said second bolt opening of said second flange of said stiffening member and through one of said bolt openings in said second flange of said deck plate.

13. The deck plate assembly of claim 12 wherein a plurality of horizontally spaced-apart stiffening members are secured to said first and second flanges of said deck plate.

14. The deck plate assembly of claim 12 wherein said stiffening member is selectively longitudinally adjustably secured to said first and second flanges of said deck plate.

15. The deck plate assembly of claim 13 wherein at least some of said stiffening members are selectively longitudinally adjustably secured to said first and second flanges of said deck plate.

* * * * *